United States Patent
Gunji

(10) Patent No.: US 7,948,205 B2
(45) Date of Patent: May 24, 2011

(54) MULTI-PHASE AC MOTOR DRIVING DEVICE

(75) Inventor: Keita Gunji, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 361 days.

(21) Appl. No.: 12/206,340

(22) Filed: Sep. 8, 2008

(65) Prior Publication Data

US 2009/0073617 A1 Mar. 19, 2009

(30) Foreign Application Priority Data

Sep. 13, 2007 (JP) ................................ 2007-237426

(51) Int. Cl.
*H02P 27/04* (2006.01)
(52) U.S. Cl. ............... 318/801; 318/800; 361/1; 361/23
(58) Field of Classification Search ................... 318/800, 318/801; 361/1, 23
See application file for complete search history.

(56) References Cited

U.S. PATENT DOCUMENTS

| | | | |
|---|---|---|---|
| 7,483,279 B2 * | 1/2009 | Lee | 363/41 |
| 7,626,838 B2 * | 12/2009 | Gunji | 363/56.04 |
| 2004/0189506 A1 | 9/2004 | Kuner et al. | |
| 2005/0093505 A1 | 5/2005 | Kameya | |
| 2006/0114702 A1 * | 6/2006 | Yamada et al. | 363/132 |
| 2007/0114966 A1 | 5/2007 | Maeda et al. | |
| 2007/0165431 A1 | 7/2007 | Gunji | |

FOREIGN PATENT DOCUMENTS

| | | |
|---|---|---|
| CA | 2038846 A1 | 9/1991 |
| EP | 1 508 497 A1 | 2/2005 |
| EP | 1 612 924 A2 | 1/2006 |
| JP | 06-253585 A | 9/1994 |
| JP | 2001-314089 A | 11/2001 |
| JP | 2003-164159 A | 6/2003 |
| KR | 2003-0086670 A | 11/2003 |

OTHER PUBLICATIONS

Machine translation of JP 06253585 A.*
European Search Report for European Application No. 08159428.5-2207 dated Feb. 3, 2009, 6 pages.
Patent Abstracts of Japan, Publication No. 2001314089, Publication Date: Nov. 9, 2001, 1 page.
English abstract of KR20030086670(A) published on Nov. 12, 2003, espacenet data base, 1 page.
Patent Abstracts of Japan, Publication No. 06-253585, Publication Date: Sep. 9, 1994, 1 page.

* cited by examiner

*Primary Examiner* — Walter Benson
*Assistant Examiner* — Kawing Chan
(74) *Attorney, Agent, or Firm* — Osha Liang LLP

(57) ABSTRACT

A multi-phase AC motor driving device in which occurrence of failure is not erroneously determined is provided. In a multi-phase AC motor driving device including an inverter circuit; current detecting resistances Ru, Rv, and Rw, respectively arranged on lower arm of the respective phase of the inverter circuit, for detecting phase current of the motor; and a control portion and a PWM circuit for controlling ON/OFF operation of switching devices of the inverter circuit, the determination on the occurrence of failure based on the current values detected by the current detecting resistances is not made if the ON-duty ratios of the switching devices on the upper arms of the inverter circuit are not smaller than a predetermined value.

2 Claims, 5 Drawing Sheets

MULTI-PHASE AC MOTOR DRIVING DEVICE

BACKGROUND OF THE INVENTION

1. Field of the Invention

The present invention relates to multiphase alternating current (AC) motor driving devices for driving a multiphase AC motor with an inverter circuit, in particular, to a multiphase AC motor driving device for determining the occurrence of failure based on the detection results of the current values of the respective phases.

2. Description of the Related Art

An electric power steering device in a vehicle is provided with an AC motor such as a three-phase brushless motor in order to apply to a steering mechanism a steering aiding force corresponding to a steering torque of a handle. A motor drive unit includes a PWM (Pulse Width Modulation) circuit for generating PWM signals having a duty ratio corresponding to the command value and an inverter circuit including pairs of upper and lower switching devices, which are turned ON/OFF according to the duty ratio of the PWM signal output from the PWM circuit, provided for respective phases. The inverter circuit outputs voltage for the respective phases corresponding to the aforementioned duty ratio based on the ON/OFF operations of the switching devices, to drive the motor with the voltages. The currents in the respective phases of the motor are detected by a current detection resistance connected in series with the switching device, and the detected value is the value of the current actually flowing through the motor.

Japanese Laid-Open Patent Publication No. 2005-143153, No. H6-253585, No. 2003-164159, and No. 2007-189825 described below disclose a multiphase AC motor driving device using the inverter circuit. In the device of Japanese Laid-Open Patent Publication No. 2005-143153, an estimated value of the current flowing through the inverter circuit is calculated based on an application voltage and a resistance value between a power supply and a motor, and an actual current value detected in an actual current detecting section and the estimated current value are compared to detect abnormality in the values of the currents flowing through the respective phases. In the device of Japanese Laid-Open Patent Publication No. H6-253585, using the fact that the sum of the current values of the respective phases of the three-phase AC motor is zero, determination is made as abnormal when the sum of the detected current values of the respective phases is not zero. In the device of Japanese Laid-Open Patent Publication No. 2003-164159, a first current value including a voltage drop value of a current detection resistance is used as a current value of a phase in which duty ratio of a switching device on the lower side in the inverter circuit is greater than or equal to a predetermined value, and a second current value in which the sign of the sum of the voltage drop values of the current detection resistances of the other two phases is reversed is used as a current value of the phase which duty ratio of the switching device on the lower side is smaller than a predetermined value, so that the current detection accuracy can be enhanced by the second current value even if the duty ratio of the device is small and the current cannot be accurately detected In the device of Japanese Laid-Open Patent Publication No. 2007-189825, the phase currents flowing through the reflux diodes connected in parallel to the switching devices are detected during a dead time period in which the upper and lower switching devices of the inverter circuit are both turned OFF to lengthen the sampling period and enable motor control with high accuracy.

In the motor driving device using the inverter circuit as described above, the sum of the currents of the respective phases of the motor is known to be zero, and thus the occurrence of failure of the motor driving device or the motor can be determined by detecting the currents of the respective phases and determining whether the sum is zero as in Japanese Laid-Open Patent Publication No. H6-253585.

In an inverter circuit of turning ON/OFF the switching devices arranged in upper and lower pairs for the respective phases with a PWM signal, the turn-ON time T2 of the lower side switching devices becomes long when the turn-ON time T1 of the upper side switching devices is short (i.e., when the ON duty ratio is small), as shown in FIG. 4, and the turn-ON time T2 of the lower side switching devices becomes short when the turn-ON time T1 of the upper side switching devices is long (i.e., when the ON duty ratio is large), as shown in FIG. 5.

In the case of FIG. 4, the turn-ON time T2 of the lower side switching devices is long, and thus the phase current flowing through the current detection resistance through the switching device can be accurately detected; whereas in the case of FIG. 5, the turn-ON time T2 of the lower side switching device is short, and thus the phase current flowing through the current detection resistance through the switching device becomes difficult to detect accurately. That is, as disclosed in Japanese Laid-Open Patent Publication No. 2003-164159, when the duty ratio of the lower side switching devices becomes smaller than 30%, the switching devices may not be sufficiently turned ON due to obtuseness etc. of the waveform of the gate voltage to be applied to the device, and the phase current cannot be accurately detected. When charging the voltage generated in the current detection resistance of the respective phase to the condenser, sample holding the same, and detecting the phase current, the turn-ON time of the switching device becomes shorter than a time constant of a charging circuit, sample hold is not accurately performed, and the error occurs in the detection of the phase current.

As a result, the sum of the current values of the respective phases detected by the current detection resistances does not become zero, and determination is sometimes made that failure has occurred. The sum of the currents does not become zero because the phase currents cannot be accurately detected since the duty ratio of the lower side switching devices is small, and not because abnormality is found in the motor 4 and the drive circuit, and thus the determination is an erroneous determination.

Thus in the conventional device, determination is erroneously made that failure has occurred when actually failure has not occurred when the duty ratio of the lower side switching devices of the inverter circuit is small.

It is an object of the present invention to provide a multiphase AC motor driving device which does not make an erroneous determination on the occurrence of failure.

SUMMARY OF THE INVENTION

A multi-phase AC motor driving device that serves as a basis of the present invention includes an inverter circuit for driving a motor; a current detecting section for detecting a phase current of the motor; a control section for controlling a switching device of the inverter circuit; and a first determining section for determining occurrence of a failure. The inverter circuit includes pairs of upper and lower arms provided in association with respective phases of a motor, the inverter circuit being constituted such that the respective arm has a switching device for driving a multi-phase AC motor and a reflux diode connected in parallel to the device, and a voltage for driving the motor is extracted from a connection point of the upper and lower arms of the respective phases. The current detecting section, arranged in the lower arm of the respective phase of the inverter circuit, detects a phase current of the motor. The control section controls ON/OFF operation of each switching device of the inverter circuit with a predetermined duty ratio. The first determining section determines occurrence of a failure based on a current value detected by the current detecting section.

According to the present invention, in the multi-phase AC motor driving device described above, a second determining section for determining whether or not all ON-duty ratios of the switching devices of the upper arms of the inverter circuit are smaller than a predetermined value is arranged The first determining section does not make a determination on the occurrence of the failure if the second determining section determines that the ON-duty ratios are not smaller than the predetermined value, and the first determining section makes a determination on the occurrence of the failure if the second determining section determines that the ON-duty ratios are smaller than the predetermined value.

Accordingly, if the ON-duty ratios of the upper side switching devices are large, that is, if the ON-duty ratios of the lower side switching devices are small, the failure diagnosis based on the detected current values is not performed even if the currents flowing during a short turn-ON period of the lower side switching devices are detected by the current detecting section, and thus erroneous determination that failure has occurred is not made, and the reliability of the device can be enhanced.

In the present invention, when determining that the ON-duty ratios of the upper switching device are not smaller than the predetermined value, the second determining section compares an absolute value of the current value of one phase and an absolute value of a sum of the current values of the other phases if only the ON-duty ratio of the switching device of the upper arm of one phase is greater than or equal to the predetermined value, and determines an error in a detection result of the current value of the one phase if the absolute value of the current value of the one phase is larger than the absolute value of the sum of the current values of the other phases. Thus, error in the detection result of the current value of a specific phase can be determined even if the failure determination is not performed.

In the present invention, when determining that the ON-duty ratios of the upper switching device are not smaller than the predetermined value, the second determining section compares an absolute value of a sum of the current values of a plurality of phases and an absolute value of the current value of the other one phase if the ON-duty ratios of the switching devices of the upper arms of the plurality of phases excluding one phase is greater than or equal to the predetermined value, and determines an error in a detection result of the current values of the plurality of phases if the absolute value of the sum of the current values of the plurality of phases is larger than the absolute value of the current value of the other one phase. Thus, error in the detection result of the current values of a plurality of specific phases can be determined even if the failure determination is not performed.

According to the present invention, the failure diagnosis is not performed when the ON-duty ratios of the lower side switching devices are small and the phase current cannot be accurately detected, and thus erroneous determination that failure has occurred is not made and the reliability of the device can be enhanced.

DETAILED DESCRIPTION OF THE PREFERRED EMBODIMENTS

Figure 1A:
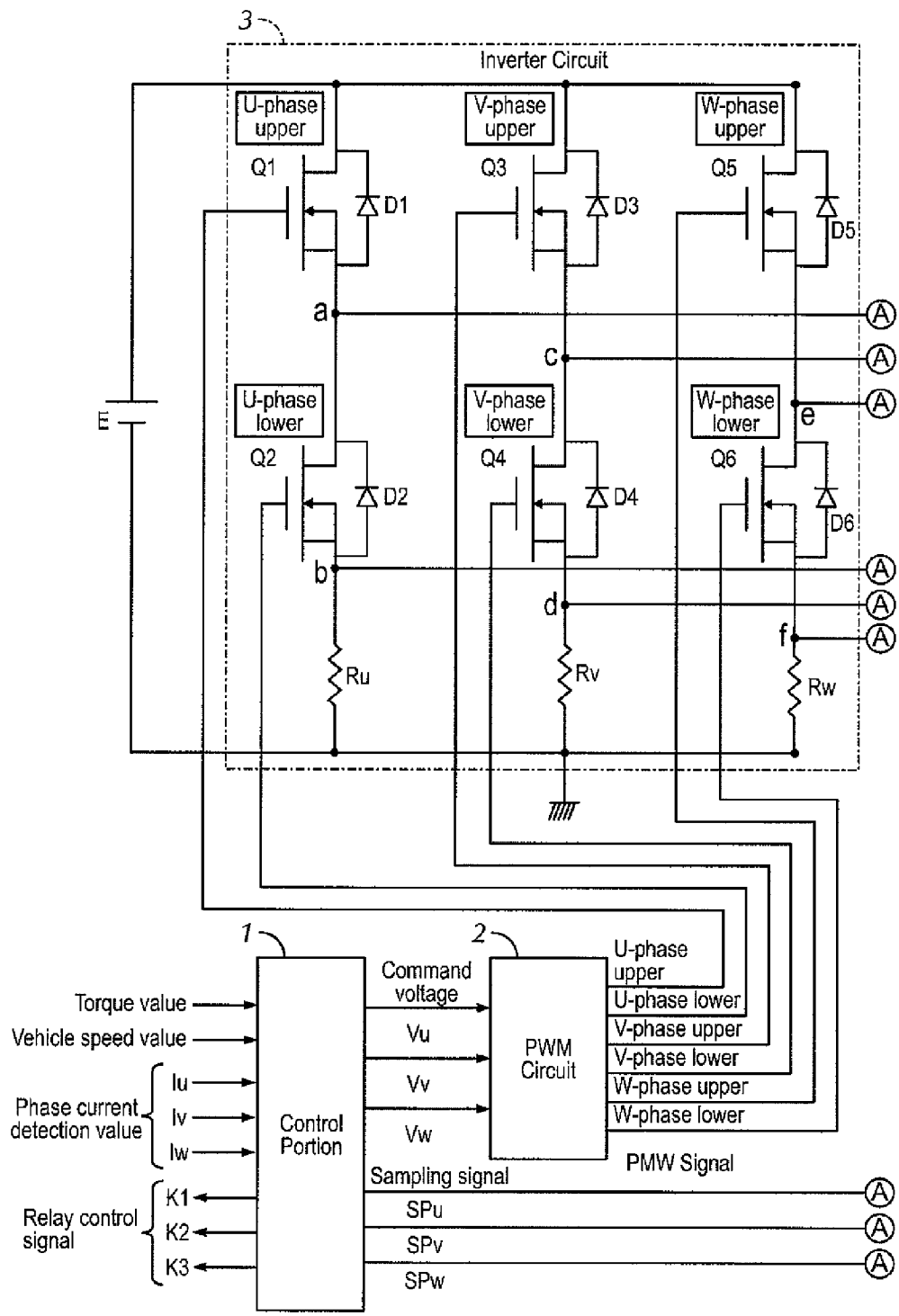
FIGS. 1A and 1B show a view of an electrical structure of a multi-phase AC motor driving device according to an embodiment of the present invention.
Figure 1B:
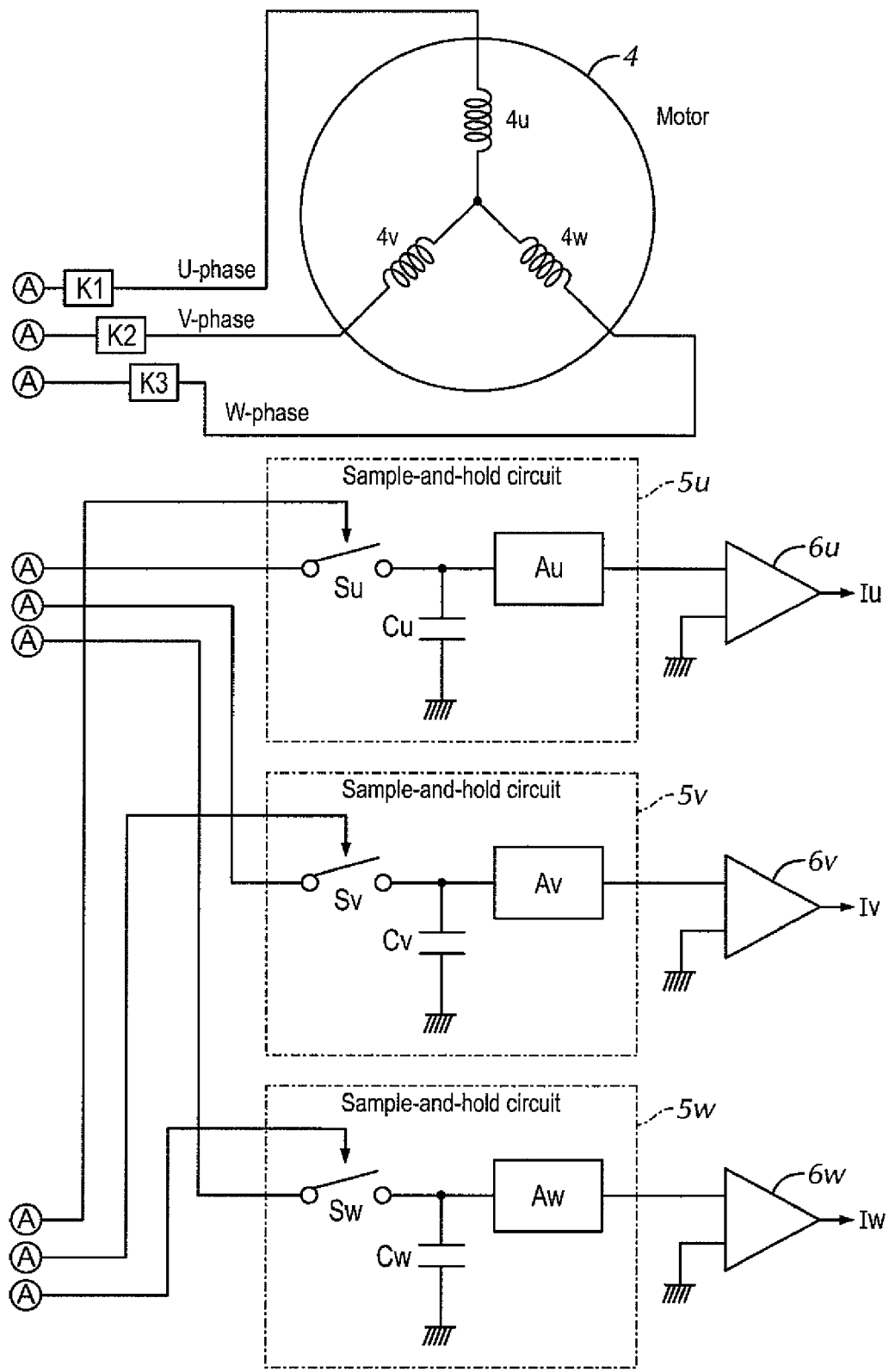

FIGS. 1A and 1B show a view of an electrical structure of a multi-phase AC motor driving device according to an embodiment of the present invention. The electrical structure of a multi-phase AC motor driving device includes a control portion 1 constituted by a CPU, a memory and the like; a known PWM circuit 2 which outputs PWM signals having predetermined duty ratios based on command voltages Vu to Vw from the control portion 1; an inverter circuit 3 which outputs motor-driving three-phase voltages (U-phase voltage, V-phase voltage, W-phase voltage) based on the PWM signals from the PWM circuit 2; a three-phase AC motor 4 (hereinafter simply referred to as "motor") driven by the three-phase voltage output from the inverter circuit 3; windings $4u$, $4v$, and $4w$ of the respective phases of the motor 4; sample-and-hold circuits $5u$, $5v$, and $5w$; relays K1, K2, and K3 connected between the inverter circuit 3 and the motor 4. A large current open/close switch may be used in place of the relay. The control portion 1, the PWM circuit 2, the inverter circuit 3, the sample-and-hold circuits $5u$, $5v$, and $5w$, the DC amplification circuits $6u$, $6v$, and $6w$, and the relays K1, K2, and K3 configure the motor driving device.

The inverter circuit 3 is connected between a positive electrode and a negative electrode (ground) of the battery E and converts the DC voltage of the battery E into an AC voltage. This inverter circuit 3 is a known circuit, and includes pairs of upper and lower arms provided in association with the U-phase, the V-phase, and the W-phase, the respective arms including switching devices Q1 to Q6, and reflux diodes D1 to D6 connected in parallel to the respective switching devices. The switching devices Q1 to Q6 are constituted by MOS FETs (Field Effect Transistors), but instead thereof, IGBTs (Insulated Gate Bipolar Mode Transistor) or other devices can be employed. The respective gates of the switching device Q1 to Q6 are individually provided with six types of PWM signals (U-phase upper, U-phase lower, V-phase upper, V-phase lower, W-phase upper, W-phase lower) from the PWM circuit 2. During the ON (High) periods of the PWM signals, the switching devices Q1 to Q6 are turned ON (conduction state), while during the OFF (Low) periods of the PWM signals the switching devices Q1 to Q6 are turned OFF (cut-off state).

Through the ON/OFF operations of the switching devices Q1 to Q6, the U-phase voltage, the V-phase voltage, and the W-phase voltage for driving the motor are extracted from the connection points a, c, and e between the upper and lower arms of the respective phases in the inverter circuit 3 and are supplied to the motor 4. Namely, the U-phase voltage is extracted from the connection point a between the switching devices Q1, Q2 and is supplied to the U-phase winding $4u$ of the motor 4 through the relay K1. The V-phase voltage is extracted from the connection point c between the switching devices Q3, Q4 and is supplied to the V-phase winding 4v of the motor 4 through the relay K2. The W-phase voltage is extracted from the connection point e between the switching devices Q5, Q6 and is supplied to the W-phase winding 4w of the motor 4 through the relay K3. The motor 4 is constituted by, for example, a three-phase brushless motor.

There are provided current detection resistances Ru, Rv, and Rw for detecting the phase currents of the motor 4 on the lower arms of the respective phases in the inverter circuit 3. The current detection resistance Ru is connected in series with the switching devices Q1, Q2, and the voltage generated across the opposite ends of the resistance Ru (electric potential at point b) is input to the sample-and-hold circuit 5u. The current detection resistance Rv is connected in series with the switching devices Q3, Q4, and the voltage generated across opposite ends of the resistance Rv (electric potential at point d) is input to the sample-and-hold circuit 5v. The current detection circuit Rw is connected in series with the switching devices Q5, Q6, and the voltage generated across opposite ends of the resistance Rw (electric potential at point f) is input to the sample-and-hold circuit 5w.

The sample-and-hold circuits 5u, 5v, and 5w include switches Su, Sv, Sw; condensers Cu, Cv, Cw; and differential amplifiers Au, Av, Aw. When currents flow through the current detection resistances Ru, Rv, and Rw in the inverter circuit 3, and, thus, the voltages to be detected are generated between the opposite ends of the resistances, the switches Su, Sv, and Sw are set to ON through sampling signals SPu, SPv, SPw from the control portion 1, and the voltages to be detected are sampled in such a way that they charge the condensers Cu, Cv, Cw through the switches Su, Sv, and Sw being turned ON. Thereafter, when currents no longer flow through the current detection resistances Ru, Rv, Rw, and there is a necessity to hold the sampled voltage, the switches Su, Sv, Sw are turned OFF to maintain the voltages charged at the condensers Cu, Cv, and Cw. The voltages sampled and held as described above are amplified by the DC amplification circuits 6u, 6v, and 6w to be output as phase currents Iu, Iv, and Iw. The phase currents Iu, Iv, Iw indicate the values of actual currents flowing through the respective phases of the motor 4, and are supplied to the control portion 1 as phase current detection values.

The control portion 1 calculates the currents to be flowed through the respective phases of the motor 4, that is, the target values of the motor currents for providing a required steering aiding force, based on a torque value detected by a torque sensor (not illustrated) and a vehicle speed value detected by a vehicle speed sensor (not illustrated), and makes comparison between the target values and the phase currents Iu, Iv, Iw (detected values) to determine the deviations therebetween. Then, based on the resultant deviations, the control portion 1 calculates command voltages Vu, Vv, and Vw for the respective phases which are to be supplied to the PWM circuit 2. The command voltages are parameters for performing feedback control such that currents having the target values flow through the windings 4u, 4v, and 4w of the respective phases in the motor 4. The PWM circuit 2 creates six types of PWM signals having predetermined duty ratios as described above, based on the command voltage, such that a U-phase voltage, a V-phase voltage, and a W-phase voltage corresponding to the command voltages Vu, Vv, Vw are supplied to the motor 4, and then supplies them to the respective switching device Q1 to Q6 of the inverter circuit 3. The control portion 1 outputs a relay control signal for controlling ON/OFF of each relay K1, K2, and K3.

In the above configuration, the current detection resistances Ru, Rv, Rw configure one embodiment of the current detecting section in the present invention; the control portion 1 configures one embodiment of a first determining section and a second determining section in the present invention; and the control portion 1 and the PWM circuit 2 configure one embodiment of a control section in the present invention.

Figure 2:
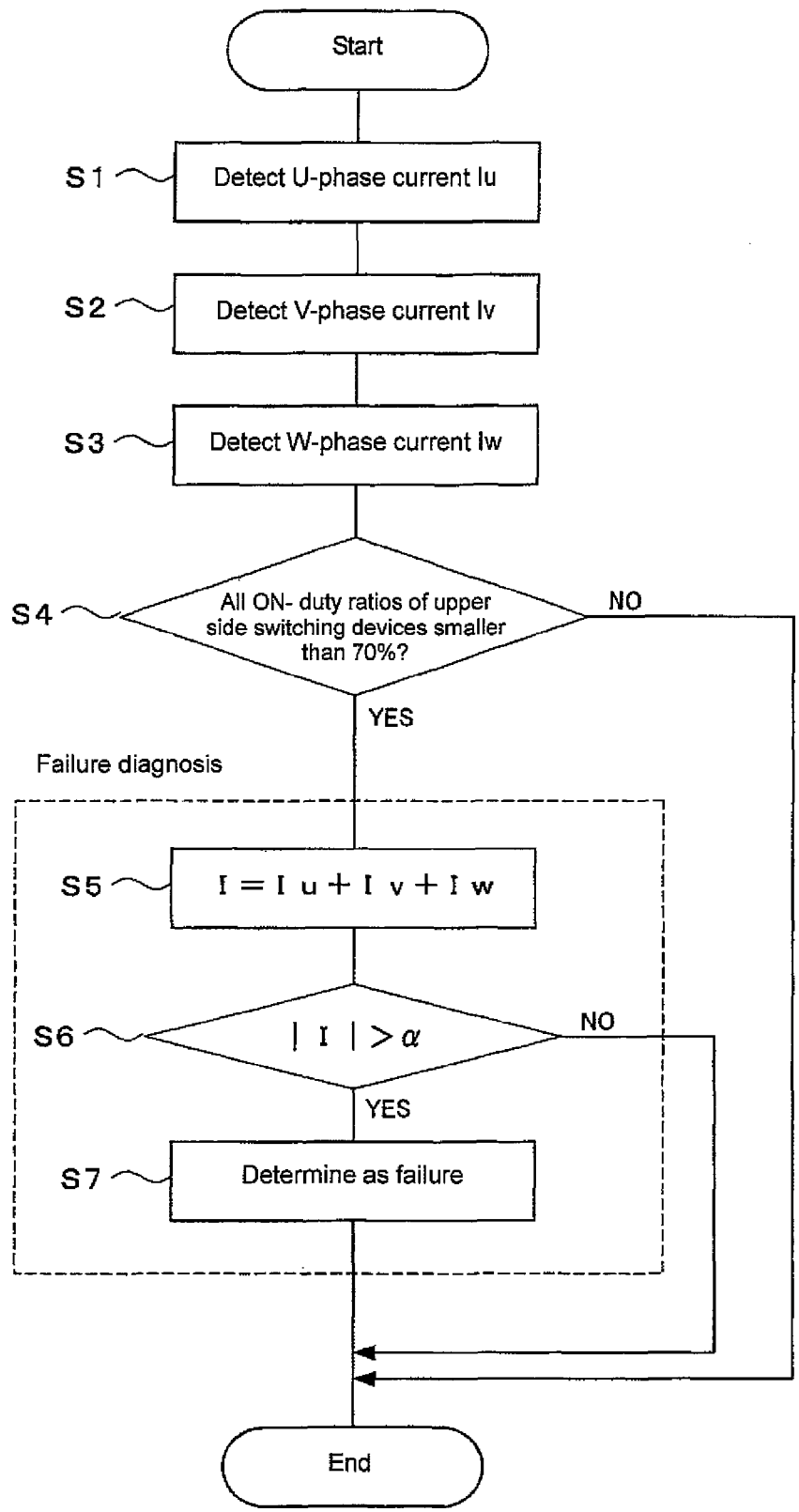
FIG. 2 shows a flowchart of a procedure of a failure diagnosis.

The procedure of failure diagnosis in the circuit of FIGS. 1A and 1B will now be described based on the flowchart shown in FIG. 2.

In step S1, the U-phase current Iu flowing through the current detection resistance Ru is detected by the sample-and-hold circuit 5u and the DC amplification circuit 6u based on the electric potential at point b. In step S2, the V-phase current Iv flowing through the current detection resistance Rv is detected by the sample-and-hold circuit 5v and the DC amplification circuit 6v based on the electric potential at point d. In step S3, the W-phase current Iw flowing through the current detection resistance Rw is detected by the sample-and-hold circuit 5w and the DC amplification circuit 6w based on the electric potential at point f.

Subsequently, in step S4, whether or not all the ON duty ratios of the switching devices Q1, Q3, and Q5 on the upper side in the inverter circuit 3 are smaller than 70% is determined. The ON duty ratios of the switching devices Q1, Q3, and Q5 can be judged by checking what command voltage is being supplied from the control portion 1 to the PWM circuit 2 by the control portion 1 itself. If the ON duty ratios of the upper side switching devices Q1, Q3, and Q5 are smaller than 70% as a result of the determination in step S4, in other words, if the ON duty ratios of the switching devices Q2, Q4 and Q6 on the lower side are greater than or equal to 30% (step S4: YES), the process proceeds to a failure diagnosis process of steps S5 to S7.

In step S5, the sum I=Iu+Iv+Iw of the current values of the respective phases is calculated based on the U-phase current Iu, the V-phase current Iv, and the W-phase current Iw detected in steps S1 to S3. In the following step S6, the absolute value |I| of I obtained in step S5 and a predetermined value α are compared. Since the sum of the currents of the respective phases of the motor is theoretically zero, the value of α is ideally α=0, but actually, it is a value containing slight error difference. If not |I|>α (step S6: NO) as a result of the determination in step S6, the device is judged as normally operating, and the process is terminated without executing step S7. If |I|>α as a result of the determination in step S6 (step S6: YES), the process proceeds to step S7, and the device is judged as having a failure. The control portion 1 then performs a process of stopping the operation of the motor driving device.

If the ON duty ratios of the upper side switching devices Q1, Q3, and Q5 are not smaller than 70% as a result of the determination in step S4, in other words, if the ON duty ratios of the lower side switching devices Q2, Q4, and Q6 are smaller than 30% (step S4: NO), the process is terminated without executing the failure diagnosis process of steps S5 to S7. This aspect is the characteristic of the present embodiment, and erroneous determination on the occurrence of failure can be avoided.

That is, in a state where the ON duty ratios of the lower side switching devices Q2, Q4, and Q6 are smaller than 30%, the period in which the current flows through the current detection resistances Ru, Rv, and Rw does not satisfy the charge time constant of the condensers Cu, Cv, Cw of the sample-and-hold circuits 5u, 5v, and 5w since the turn-ON time of the devices is short. Thus, the voltage generated in the current detection resistances Ru, Rv, and Rw is not accurately sampled and held in the condensers Cu, Cv, and Cw, and an error occurs in the values of the phase currents Iu, Iv, and Iw output from the DC amplification circuits 6*u*, 6*v*, and 6*w*. Therefore, if the failure diagnosis process is performed in this case, the sum Iu+Iv+Iw of the current values of the respective phases does not become zero, and erroneous determination that failure has occurred might be made. The failure diagnosis based on the current values is not performed if the failure diagnosis process is prohibited when the ON duty ratios of the lower side switching devices Q2, Q4, and Q6 are smaller than 30%, and thus erroneous determination that failure has occurred is not made, and the reliability of the device can be enhanced.

Figure 3:
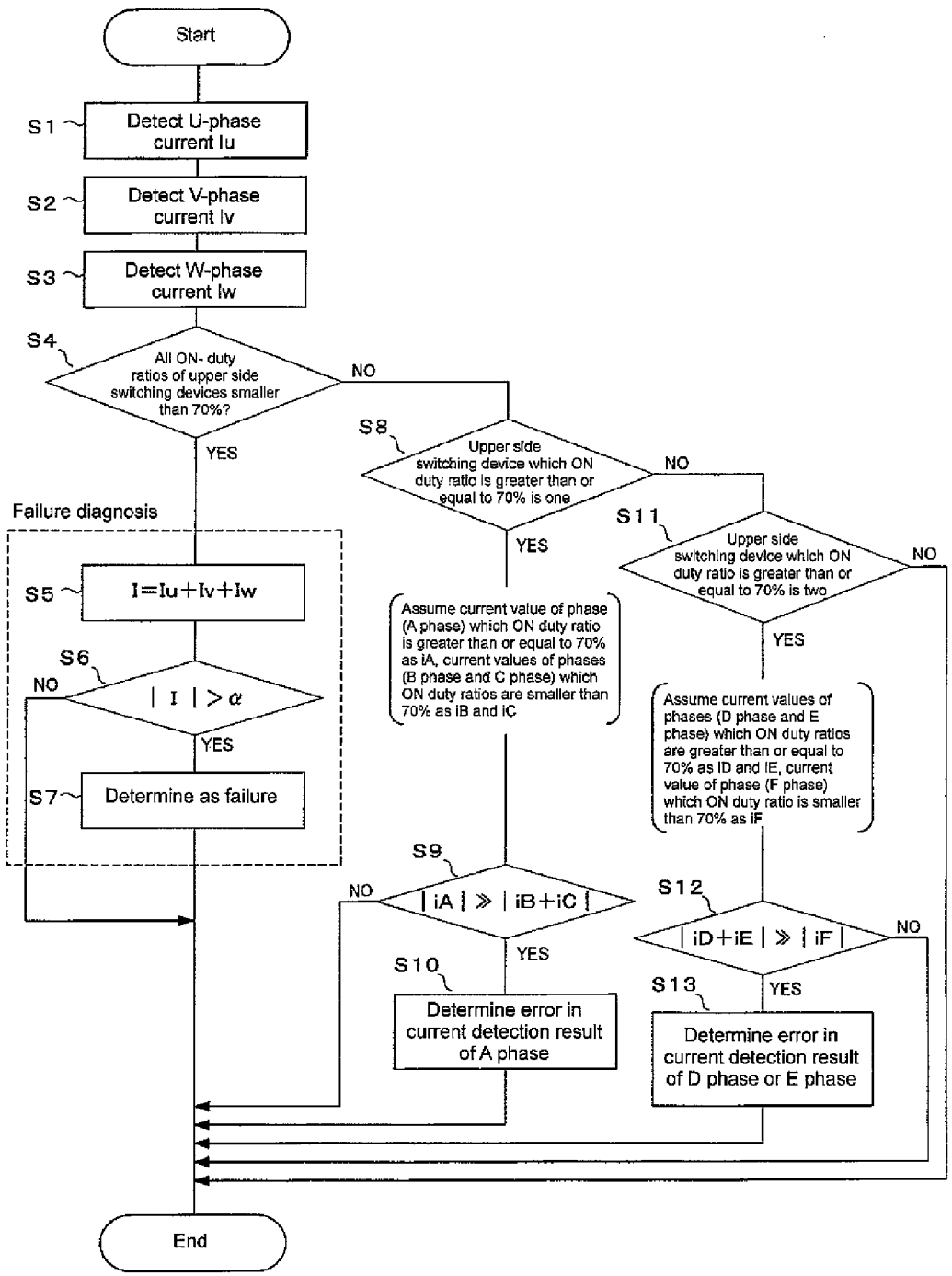
FIG. 3 shows a flowchart of another procedure of the failure diagnosis.
Figure 4:
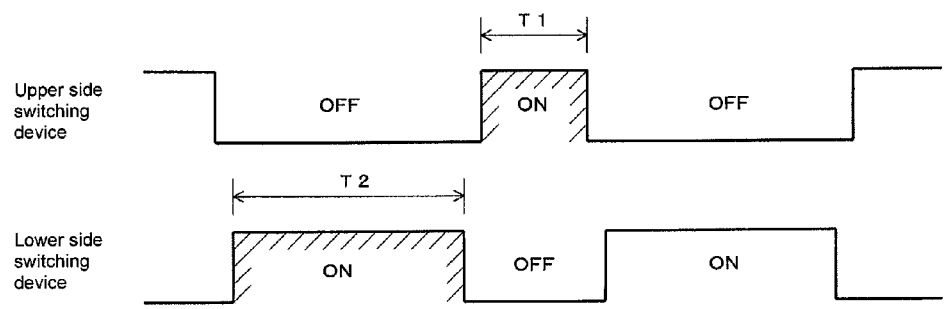
FIG. 4 shows a view describing a turn-ON time of a switching device.
Figure 5:
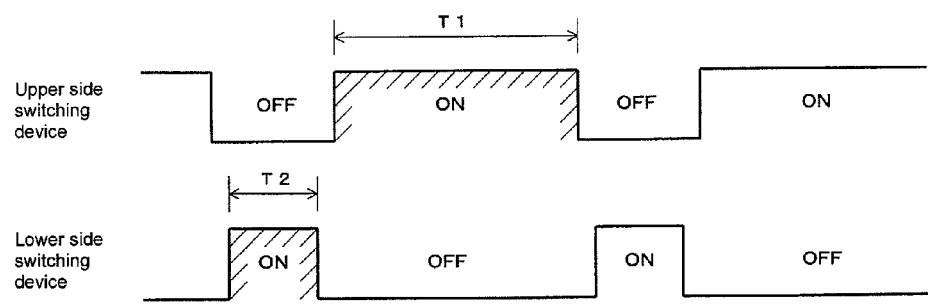
FIG. 5 shows a view describing a turn-ON time of the switching device.

FIG. 3 is a flowchart showing other procedures of the failure diagnosis. In FIG. 3 same reference numerals are denoted for steps performing the same process as in FIG. 2. Steps S1 to S7 are exactly the same as FIG. 2. That is, the U-phase current Iu is detected in step S1, the V-phase current Iv is detected in step S2, and the W-phase current Iw is detected in step S3, and thereafter, whether or not all the ON duty ratios of the upper side switching devices Q1, Q3, and Q5 are smaller than 70% is determined, where if smaller than 70% (step S4: YES), the failure diagnosis process of steps S5 to S7 is executed. In the case of FIG. 2, the process is terminated without performing the failure diagnosis if the ON duty ratios are not smaller than 70% (step S4: NO) in step S4, but in FIG. 3, the processes of steps S8 to S13 are added if the ON duty ratios are not smaller than 70% (step S4: NO).

In step S8, whether or not the upper side switching devices which ON duty ratios are greater than or equal to 70% is only one is determined. If only one (step S8: YES), whether or not the relationship of $$|iA| >> |iB+iC| \qquad (1)$$

that is, the relationship of $|iA|-|iB+iC|>\beta$ is met is determined in step S9, where iA is the detected current value of the phase (A phase) of the relevant switching device, and iB and iC are the detected current values of the other two phases (B phase, C phase) which ON duty ratios are smaller than 70%. Here, $\beta$ is a threshold value set in advance. The process proceeds to step S10 if the relationship of equation (1) is met (step S9: YES), and the process is terminated without executing step S10 if the relationship is not met (step S9: NO).

In step S10, determination is made that there is an error in the current detection result of the A phase when the relationship of equation (1) is met. In the above example, the reliability of the detected current value iA of the A phase is low since the ON duty ratio of the upper side switching device of the A phase is greater than or equal to 70% (ON duty ratio of the lower side switching device is smaller than 30%). The detected current values iB and iC of the B phase and the C phase are reliable values since the ON duty ratios of the upper side switching devices of the B phase and the C phase are smaller than 70% (ON duty ratio of the lower side switching devices are greater than or equal to 30%). As the sum iA+iB+iC of the currents of the respective phases theoretically becomes zero, the detected current value iA of the A phase is clearly abnormal if the absolute value of iA is extremely large compared to the absolute value of iB+iC as in equation (1) when iA and iB+iC are compared. The control portion 1 then determines that the failure occurred in the circuit of A phase and that the detected current value iA of the A phase is an error, and performs processes such as failure signal output and the like. Error in the detection result of the current value can be judged on a specific phase which ON duty ratio of the upper side switching device is greater than or equal to 70% even if the failure determination of steps S5 to S7 is not performed.

If the upper side switching devices which ON duty ratios are greater than or equal to 70% are not only one (step S8: NO), the process proceeds to step S11, and whether or not the upper side switching devices which ON duty ratios are greater than or equal to 70% are two is determined. If two (step S11: YES), whether or not the relationship $$|iD+iE| >> |iF| \qquad (2)$$

that is, the relationship of $|iD+iE|-|iF|>\gamma$ is met is determined in step S12, where iD and iE are the detected currents of the phases (D phase and E phase) of the switching devices, and iF is the detected current of the other one phase (F phase) which ON duty ratio is smaller than 70%. Here, $\gamma$ is a threshold value set in advance. The process proceeds to step S13 if the relationship of equation (2) is met (step S12: YES), and the process is terminated without executing step S13 if the relationship is not met (step S12: NO).

In step S13, determination is made that there is an error in the current detection result of the D phase or the E phase when the relationship of equation (2) is met. In this example, the reliability of the detected current values iD and iE of the D phase and the E phase is low since the ON duty ratios of the upper side switching devices of the D phase and the E phase are greater than or equal to 70% (ON duty ratios of the lower side switching device are smaller than 30%). The detected current value iF of the F phase is a reliable value since the ON duty ratio of the upper side switching devices of the F phase is smaller than 70% (ON duty ratio of the lower side switching devices are greater than or equal to 30%). As the sum iD+iE+iF of the currents of the respective phases theoretically becomes zero, the detected current values iD and iE of the D phase and the E phase are clearly abnormal if the absolute value of iD+iE is extremely large compared to the absolute value of iF as in equation (2) when iD+iE and iF are compared. The control portion 1 then determines that the failure occurred in the circuit of D phase or E phase and that the detected current value iD, iE of the relevant phase is an error, and performs processes such as failure signal output and the like. Error in the detection result of the current value can be judged on a specific plurality of phases which ON duty ratios of the upper side switching devices are greater than or equal to 70% even if the failure determination of steps S5 to S7 is not performed.

In the embodiment described above, an example of having the ON duty ratios of the upper side switching devices as smaller than 70% (ON duty ratio of lower side switching devices are greater than or equal to 30%) as a criterion for determining whether or not to perform the failure diagnosis has been described, but this is merely one example, and determination may be made based on whether the ON duty ratios of the upper side switching devices are smaller than 80% (ON duty ratios of lower side switching device are greater than or equal to 20%).

In the embodiments described above, a brushless motor has been described for the motor 4 by way of example, but the present invention is applicable to motor driving devices in general for driving an AC motor with a plurality of phases such as an induction motor and a synchronous motor.

An example of applying the present invention to an electric power steering device of a vehicle has been described in the above embodiments, but the present invention is also applicable to devices for driving a door opening/closing motor, and the like.

What is claimed is:
1. A multi-phase AC motor driving device comprising:
an inverter circuit including pairs of upper and lower arms providing in association with respective phases of the motor, the inverter circuit being constituted such that the respective arm has a switching device for driving the multi-phase AC motor and a reflux diode connected in parallel to the switching device, and a voltage for driving the motor is extracted from a connection point of the upper and lower arms of the respective phases;

a current detecting section, arranged in the lower arm of the respective phase of the inverter circuit, for detecting a phase current of the motor;

a control section for controlling ON/OFF operation of each switching device of the inverter circuit with the predetermined duty ratio;

a first determining occurrence of a failure based on a current value detected by the current detecting section; the multi-phase AC motor driving device further comprising; and a second determining section for determining whether or not all ON-duty ratios of the switching devices of the upper arms of the inverter circuit are smaller than a predetermined value, wherein the first determining section does not make a determination on the occurrence of the failure if the second determining section determines that the ON-duty ratios are not smaller than the predetermined value, wherein the first determining section makes a determination on the occurrence of the failure if the second determining section determines that the ON-duty ratios are smaller than the predetermined value, and wherein when determining that the ON-duty ratios are not smaller than the predetermined value, the second determining section compares an absolute value of the current value of one phase and an absolute value of a sum of current values of the other phases if only the ON-duty ratio of the switching device of the upper arm of one phase if the absolute value of the current value of the one phase is larger than the absolute value of the sum of the current values of the other phases.

2. A multi-phase AC motor driving device comprising:

an inverter circuit including pairs of upper and lower arms providing in association with respective phases of the motor, the inverter circuit being constituted such that the respective arm has a switching device for driving the multi-phase AC motor and a reflux diode connected in parallel to the switching device, and a voltage for driving the motor is extracted from a connection point of the upper and lower arms of the respective phases;

a current detecting section, arranged in the lower arm of the respective phase of the inverter circuit, for detecting a phase current of the motor;

a control section for controlling ON/OFF operation of each switching device of the inverter circuit with the predetermined duty ratio;

a first determining occurrence of a failure based on a current value detected by the current detecting section; the multi-phase AC motor driving device further comprising; and a second determining section for determining whether or not all ON-duty ratios of the switching devices of the upper arms of the inverter circuit are smaller than a predetermined value, wherein the first determining section does not make a determination on the occurrence of the failure if the second determining section determines that the ON-duty ratios are not smaller than the predetermined value, wherein the first determining section makes a determination on the occurrence of the failure if the second determining section determines that the ON-duty ratios are smaller than the predetermined value, and wherein determining that the ON-duty ratios are not smaller than the predetermined value, the second determining section compares an absolute value of a sum of the current values of a plurality of phases and an absolute value of the current value of the other one phase if the ON-duty ratios of the switching devices of the upper arms of the plurality of phases excluding one phase is greater than or equal to the predetermined value, and determines an error in a detection result of the current values of the plurality of phases if the absolute value of the sum of the current values of the plurality of phases is larger than the absolute value of the current value of the other one phase.

* * * * *

UNITED STATES PATENT AND TRADEMARK OFFICE
CERTIFICATE OF CORRECTION

| | | |
|---|---|---|
| PATENT NO. | : 7,948,205 B2 | Page 1 of 1 |
| APPLICATION NO. | : 12/206340 | |
| DATED | : May 24, 2011 | |
| INVENTOR(S) | : Keita Gunji | |

It is certified that error appears in the above-identified patent and that said Letters Patent is hereby corrected as shown below:

In the Claims:

At column 9, claim number 1, line number 36, the amended claim appears as "one phase if the absolute vaule of the current value of the one phase", however, column 9, claim number 1, line number 36 should appear as -- one phase is greater than or equal to the predetermined value, and determines an error in a detection result of the current value of the one phase if the absolute --.

Signed and Sealed this
Eighteenth Day of December, 2012

David J. Kappos
*Director of the United States Patent and Trademark Office*